United States Patent
Sakate et al.

(10) Patent No.: US 10,522,293 B2
(45) Date of Patent: Dec. 31, 2019

(54) MULTI-LAYER CERAMIC CAPACITOR AND METHOD OF PRODUCING THE SAME

(71) Applicant: Taiyo Yuden Co., Ltd., Tokyo (JP)

(72) Inventors: Daisuke Sakate, Tokyo (JP); Kotaro Mizuno, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 15/909,680

(22) Filed: Mar. 1, 2018

(65) Prior Publication Data
US 2018/0261390 A1    Sep. 13, 2018

(30) Foreign Application Priority Data
Mar. 8, 2017    (JP) .................. 2017-043820

(51) Int. Cl.
H01G 4/30    (2006.01)
H01G 4/12    (2006.01)
H01G 4/005    (2006.01)

(52) U.S. Cl.
CPC ............ *H01G 4/30* (2013.01); *H01G 4/1227* (2013.01); *H01G 4/1245* (2013.01); *H01G 4/005* (2013.01)

(58) Field of Classification Search
CPC ...... H01G 4/30; H01G 4/1227; H01G 4/1245; H01G 4/005
USPC ....................................... 361/321.2
See application file for complete search history.

(56) References Cited

U.S. PATENT DOCUMENTS

2014/0185185 A1    7/2014    Okajima et al.
2015/0318109 A1*   11/2015   Lee .................. H01G 4/30
                                                  361/301.4

FOREIGN PATENT DOCUMENTS

JP    2009-016796 A    1/2009
JP    2014-143392 A    8/2014

* cited by examiner

*Primary Examiner* — Michael P McFadden
(74) *Attorney, Agent, or Firm* — Saliwanchik, Lloyd & Eisenschenk

(57) ABSTRACT

A multi-layer ceramic capacitor includes a multi-layer unit, a side margin, and a bonding unit. The multi-layer unit includes ceramic layers laminated in a first direction, and internal electrodes disposed between the ceramic layers and mainly containing nickel. The side margin covers the multi-layer unit from a second direction orthogonal to the first direction. The bonding unit is disposed between the multi-layer unit and the side margin and has a higher concentration of magnesium than the ceramic layers and the side margin.

4 Claims, 9 Drawing Sheets

MULTI-LAYER CERAMIC CAPACITOR AND METHOD OF PRODUCING THE SAME

CROSS-REFERENCE TO RELATED APPLICATION

This application claims the benefit under 35 U.S.C. § 119 of Japanese Patent Application No. 2017-043820, filed Mar. 8, 2017, the disclosure of which is herein incorporated by reference in its entirety.

BACKGROUND

The present invention relates to a multi-layer ceramic capacitor including side margins provided in a subsequent step, and a method of producing the multi-layer ceramic capacitor.

There is known a technique of providing a protective section (side margin) in a subsequent step in a method of producing a multi-layer ceramic capacitor, the protective section (side margin) protecting the periphery of internal electrodes. For example, Japanese Patent Application Laid-open No. 2014-143392 (hereinafter referred to as Patent Document 1) discloses a technique of producing a ceramic body, the ceramic body including internal electrodes exposed to the side surfaces thereof, and of providing protective sections to the side surfaces of the ceramic body.

Further, Japanese Patent Application Laid-open No. 2009-016796 (hereinafter referred to as Patent Document 2) discloses a technique of generating an oxidized compound in a region adjacent to the side surfaces of internal electrodes made of Ni, to improve moisture resistance.

More specifically, the technique of Patent Document 2 uses ceramics with high Mg content for side gap portions that are not yet sintered. This allows Ni to generate an oxidized compound together with Mg derived from the side gap portions in the region adjacent to the side surfaces of the internal electrodes, so that the boundary portions between the internal electrodes and the side gap portions are filled with the oxidized compound, and the moisture resistance is improved.

SUMMARY

In the protective section in which there are no internal electrodes having a low sintering temperature, the sinterability is prone to be lowered. In the protective section in which the sinterability is insufficient, a malfunction such as peel-off thereof or the like is prone to occur. In order to ensure the sinterability in the protective section, it is effective to provide magnesium in large amounts to the protective section, the magnesium having the action of improving the sinterability.

Meanwhile, magnesium has the action of inhibiting grain growth at the time of sintering. For that reason, if ceramic layers disposed between the internal electrodes contain magnesium in large amounts, crystal grains in the ceramic layers become minute and the capacitance is prone to be lowered. Thus, the large amount of magnesium is not favorable in the ceramic layers.

In this regard, the technique of Patent Document 2 needs to increase the amount of magnesium in the side gap portions in order to ensure the sinterability of the side gap portions while forming a satisfactory oxidized compound. However, if the amount of magnesium in the side gap portions is large, the amount of magnesium to be diffused to the ceramic layers at the time of sintering increases, and the capacitance is prone to be lowered.

In view of the circumstances as described above, it is desirable to provide a multi-layer ceramic capacitor and a method of producing the same, which are capable of obtaining high reliability without impairing capacitance and sinterability.

According to an embodiment of the present invention, there is provided a multi-layer ceramic capacitor including a multi-layer unit, a side margin, and a bonding unit.

The multi-layer unit includes ceramic layers laminated in a first direction, and internal electrodes disposed between the ceramic layers and mainly containing nickel.

The side margin covers the multi-layer unit from a second direction orthogonal to the first direction.

The bonding unit is disposed between the multi-layer unit and the side margin and has a higher concentration of magnesium than the ceramic layers and the side margin.

Each of the internal electrodes may include an oxidized region, the oxidized region being adjacent to the bonding unit and containing nickel and magnesium.

This configuration can be achieved by making the concentration of magnesium in the bonding unit before sintering higher than in the ceramic layers and the side margin.

In this multi-layer ceramic capacitor, the magnesium diffuses from the bonding unit to the multi-layer unit at the time of sintering. Thus, the magnesium is accurately supplied to a region adjacent to the bonding unit. As a result, oxidized regions containing nickel and magnesium are efficiently formed in the internal electrodes. With this configuration, a short circuit between the internal electrodes becomes difficult to occur, thus improving the reliability of the multi-layer ceramic capacitor.

Further, in this multi-layer ceramic capacitor, the magnesium diffuses from the bonding unit to the side margin as well at the time of sintering. Thus, the concentration of magnesium in the side margin increases. Furthermore, since the bonding unit having a higher concentration of magnesium than the side margin is disposed between the side margin and the multi-layer unit, the movement of magnesium from the side margin to the multi-layer unit is difficult to occur at the time of sintering. Therefore, the high concentration of magnesium in the side margin and the low concentration of magnesium in the multi-layer unit can coexist.

In such a manner, this multi-layer ceramic capacitor can obtain high reliability without impairing capacitance and sinterability.

A center portion of the side margin in the second direction may have a higher concentration of magnesium than center portions of the ceramic layers in the second direction.

In this configuration, since the concentration of magnesium in the side margin is high, satisfactory sinterability in the side margin is obtained. Further, since the concentration of magnesium in the ceramic layers is low, a large capacitance is obtained.

The concentration of magnesium in the ceramic layers and the side margin may increase toward the bonding unit.

According to another embodiment of the present invention, there is provided a method of producing a multi-layer ceramic capacitor, the method including: preparing an unsintered multi-layer chip that includes ceramic layers laminated in a first direction, and internal electrodes disposed between the ceramic layers; producing a ceramic body by providing a side margin to a side surface of the multi-layer chip via a bonding unit, the side surface being oriented in a second direction orthogonal to the first direction, the bonding unit having a higher concentration of magnesium than the ceramic layers and the side margin; and sintering the ceramic body.

It is possible to provide a multi-layer ceramic capacitor and a method of producing the same, which are capable of obtaining high reliability without impairing capacitance and sinterability.

These and other objects, features and advantages of the present invention will become more apparent in light of the following detailed description of embodiments thereof, as illustrated in the accompanying drawings.

DETAILED DESCRIPTION OF EMBODIMENTS

Hereinafter, an embodiment of the present invention will be described with reference to the drawings.

In the figures, an X axis, a Y axis, and a Z axis orthogonal to one another are shown as appropriate. The X axis, the Y axis, and the Z axis are common in all figures.

1. Overall Configuration of Multi-Layer Ceramic Capacitor 10

Figure 1:
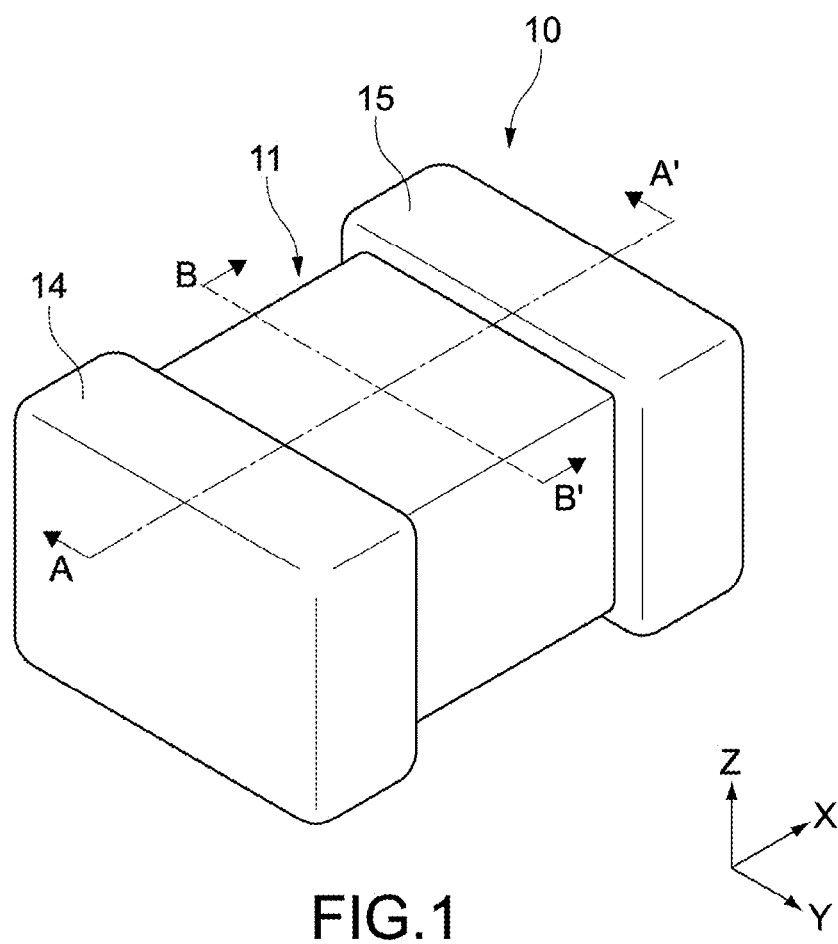
FIG. 1 is a perspective view of a multi-layer ceramic capacitor according to one embodiment of the present invention.
Figure 2:
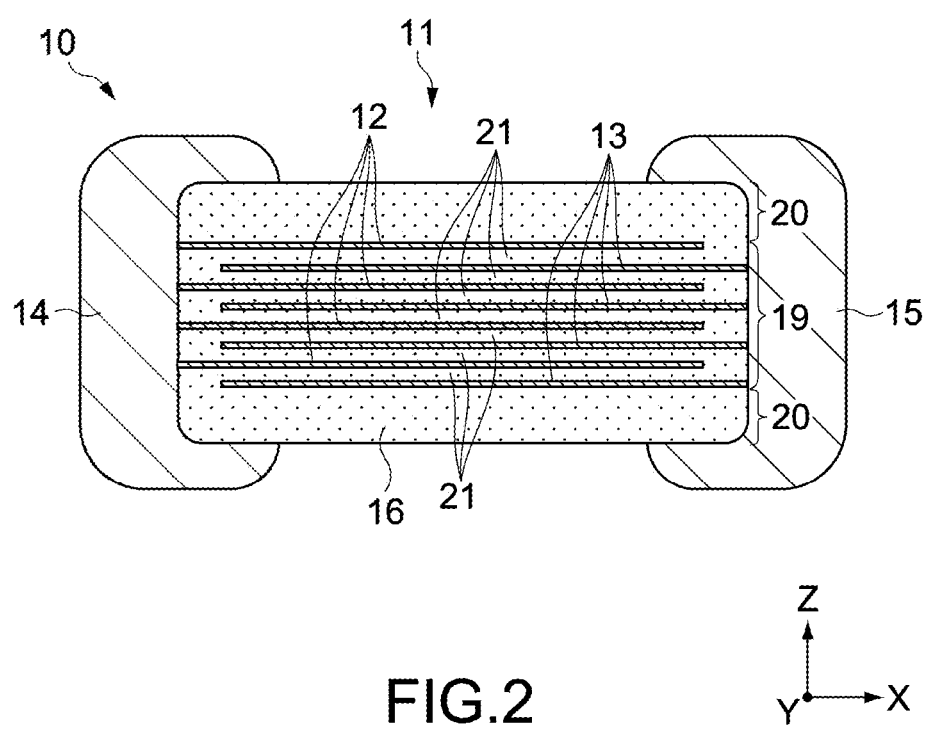
FIG. 2 is a cross-sectional view of the multi-layer ceramic capacitor taken along the A-A' line in FIG. 1.
Figure 3:
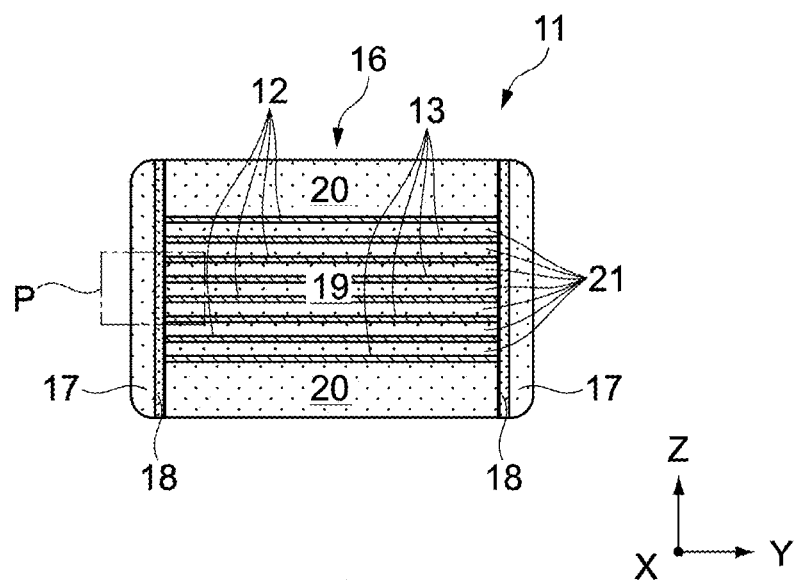
FIG. 3 is a cross-sectional view of the multi-layer ceramic capacitor taken along the B-B' line in FIG. 1.

FIGS. 1 to 3 each show a multi-layer ceramic capacitor 10 according to one embodiment of the present invention. FIG. 1 is a perspective view of the multi-layer ceramic capacitor 10. FIG. 2 is a cross-sectional view of the multi-layer ceramic capacitor 10 taken along the A-A' line in FIG. 1.

FIG. 3 is a cross-sectional view of the multi-layer ceramic capacitor 10 taken along the B-B' line in FIG. 1.

The multi-layer ceramic capacitor 10 includes a ceramic body 11, a first external electrode 14, and a second external electrode 15. Typically, the ceramic body 11 has two end surfaces oriented in an X-axis direction, two side surfaces oriented in a Y-axis direction, and two main surfaces oriented in a Z-axis direction. Ridges connecting the respective surfaces of the ceramic body 11 are chamfered.

It should be noted that the form of the ceramic body 11 is not limited to the form as described above. In other words, the ceramic body 11 may not have the rectangular form as shown in FIGS. 1 to 3. For example, the surfaces of the ceramic body 11 may be curved surfaces, and the ceramic body 11 may be rounded as a whole.

The first external electrode 14 and the second external electrode 15 cover both the end surfaces of the ceramic body 11 that are oriented in the X-axis direction, and extend to the four surfaces (two main surfaces and two side surfaces) that are connected to both the end surfaces oriented in the X-axis direction. With this configuration, both of the first external electrode 14 and the second external electrode 15 have U-shaped cross sections in parallel with an X-Z plane and an X-Y plane.

The ceramic body 11 includes a multi-layer unit 16, side margins 17, and bonding units 18. The side margins 17 cover the entire side surfaces of the multi-layer unit 16, the side surfaces being oriented in the Y-axis direction. Each of the bonding units 18 is disposed between the multi-layer unit 16 and the side margin 17 and bonds the multi-layer unit 16 and the side margin 17 to each other.

The multi-layer unit 16 includes a capacitance forming unit 19 and covers 20. The covers 20 respectively cover the upper and lower surfaces of the capacitance forming unit 19, the upper and lower surfaces being disposed in the Z-axis direction. The capacitance forming unit 19 includes a plurality of ceramic layers 21, a plurality of first internal electrodes 12, and a plurality of second internal electrodes 13. The covers 20 are not provided with the first internal electrodes 12 and the second internal electrodes 13.

The first internal electrodes 12 and the second internal electrodes 13 are mainly made of nickel (Ni) and are alternately disposed between the ceramic layers 21 along the Z-axis direction. The first internal electrodes 12 are connected to the first external electrode 14 and are separated from the second external electrode 15. The second internal electrodes 13 are connected to the second external electrode 15 and are separated from the first external electrode 14.

In such a manner, in the ceramic body 11, except for both the end surfaces, which are oriented in the X-axis direction and to which the first external electrode 14 and the second external electrode 15 are provided, the surfaces of the capacitance forming unit 19 are covered with the side margins 17 and the covers 20. The side margins 17 and the covers 20 have main functions of protecting the periphery of the capacitance forming unit 19 and ensuring insulation properties of the first internal electrodes 12 and the second internal electrodes 13.

The ceramic layers 21 disposed between the first internal electrodes 12 and the second internal electrodes 13 in the capacitance forming unit 19 are made of dielectric ceramics. In the multi-layer ceramic capacitor 10, in order to increase the capacitance in the capacitance forming unit 19, dielectric ceramics having a high dielectric constant is used as the dielectric ceramics forming the ceramic layers 21.

More specifically, in the multi-layer ceramic capacitor 10, polycrystal of a barium titanate ($BaTiO_3$) based material, i.e., polycrystal having a Perovskite structure containing barium (Ba) and titanium (Ti) is used as the dielectric ceramics having a high dielectric constant that forms the ceramic layers 21. This provides a large capacitance to the multi-layer ceramic capacitor 10.

It should be noted that the ceramic layers 21 may be made of a strontium titanate ($SrTiO_3$) based material, a calcium titanate ($CaTiO_3$) based material, a magnesium titanate ($MgTiO_3$) based material, a calcium zirconate ($CaZrO_3$) based material, a calcium zirconate titanate ($Ca(Zr,Ti)O_3$) based material, a barium zirconate ($BaZrO_3$) based material, a titanium oxide ($TiO_2$) based material, or the like.

The side margins 17, the bonding units 18, and the covers 20 are also made of dielectric ceramics. Although a material forming the side margins 17, the bonding units 18, and the covers 20 may be insulating ceramics, use of dielectric ceramics similar to that of the ceramic layers 21 leads to suppression of internal stress in the ceramic body 11.

With the configuration described above, when a voltage is applied between the first external electrode 14 and the second external electrode 15 in the multi-layer ceramic capacitor 10, the voltage is applied to the plurality of ceramic layers 21 between the first internal electrodes 12 and the second internal electrodes 13. With this configuration, the multi-layer ceramic capacitor 10 stores charge corresponding to the voltage applied between the first external electrode 14 and the second external electrode 15.

It should be noted that the configuration of the multi-layer ceramic capacitor 10 according to this embodiment is not limited to that shown in FIGS. 1 to 3 and can be changed as appropriate. For example, the number of first internal electrodes 12 and second internal electrodes 13 and the thickness of each ceramic layer 21 can be determined as appropriate according to the size and performance expected for the multi-layer ceramic capacitor 10.

2. Details of Ceramic Body 11

Figure 4:
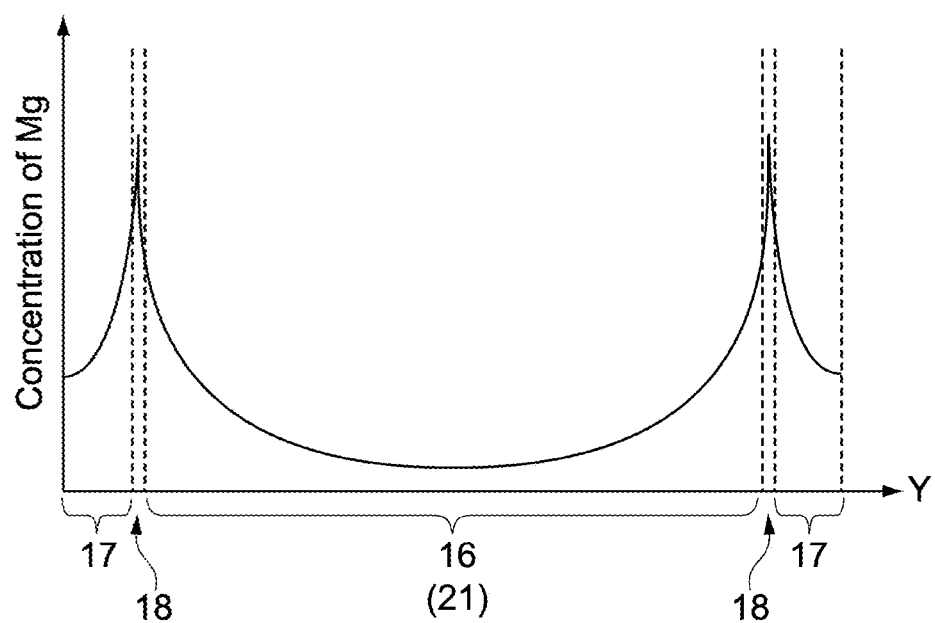
FIG. 4 is a graph showing the distribution of a concentration of magnesium in a ceramic body of the multi-layer ceramic capacitor.

FIG. 4 is a graph showing the distribution of a concentration of magnesium (Mg) in a cross section of the ceramic body 11 along the Y-axis direction, the cross section being parallel to a Y-Z plane. It should be noted that FIG. 4 shows a concentration of magnesium at the center portions of the ceramic layers 21 in the Z-axis direction as a concentration of magnesium in the multi-layer unit 16.

As shown in FIG. 4, the distribution of the concentration of magnesium along the Y-axis direction in the ceramic body 11 has peaks in the bonding units 18. In other words, in the ceramic body 11, the bonding units 18 have a higher concentration of magnesium than the ceramic layers 21 and the side margins 17.

More specifically, the ceramic layers 21 have a concave distribution of the concentration of magnesium. In other words, the concentration of magnesium of the ceramic layers 21 increases from the center portions thereof in the Y-axis direction toward the bonding units 18. Therefore, in the ceramic layers 21, the center portions in the Y-axis direction have a low concentration of magnesium, and regions adjacent to the bonding units 18 have a high concentration of magnesium.

Magnesium has the action of suppressing the grain growth of the ceramic layers 21 at the time of sintering. As a result, in the ceramic layers 21, the center portions in the Y-axis direction, which have a low concentration of magnesium, are likely to obtain large crystal grains. This increases a dielectric constant c in each of the ceramic layers 21, and the multi-layer ceramic capacitor 10 is thus likely to ensure the capacitance.

Further, in the regions of the multi-layer unit 16, which are adjacent to the bonding units 18 where a short circuit is prone to occur between the first internal electrodes 12 and the second internal electrodes 13, the ceramic layers 21 have a high concentration of magnesium, and the crystal grains of the ceramic layers 21 are kept small. This provides high insulation properties between the first internal electrodes 12 and the second internal electrodes 13, so that the reliability of the multi-layer ceramic capacitor 10 is improved.

Figure 5:
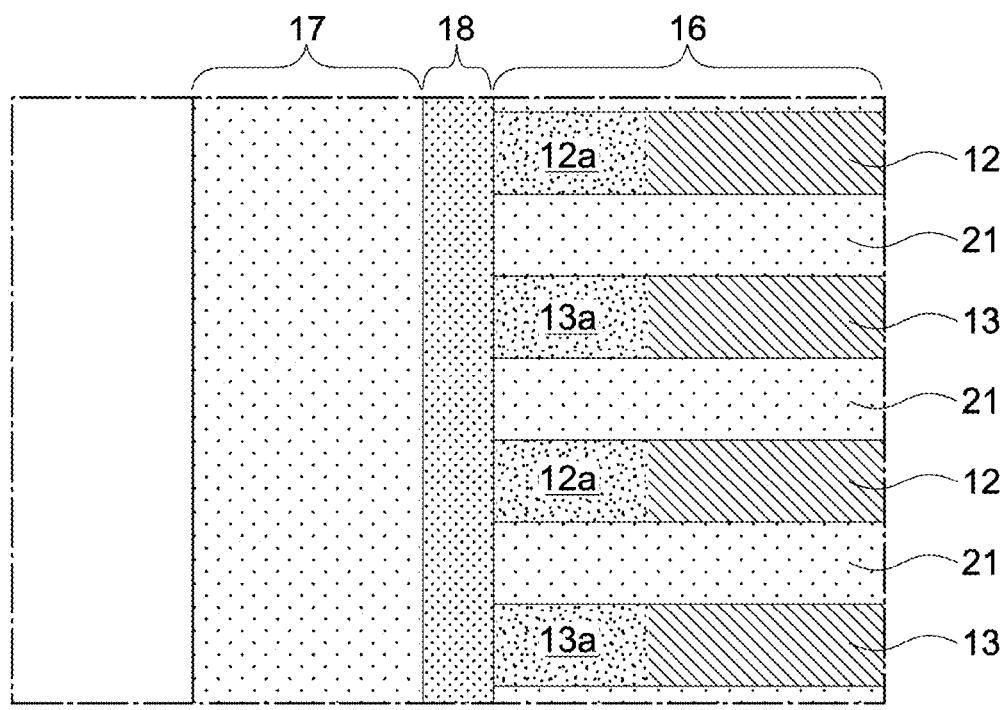
FIG. 5 is an enlarged partial cross-sectional view of a region P of the multi-layer ceramic capacitor shown in FIG. 3.

FIG. 5 is an enlarged partial cross-sectional view of a region P of the ceramic body 11, which is surrounded by a chain line of FIG. 3. The regions of the first and second internal electrodes 12 and 13, which are adjacent to the bonding units 18, respectively include oxidized regions 12a and 13a having low electrical conductivity. The oxidized regions 12a and 13a contain nickel and magnesium and are typically made of a ternary oxide containing nickel and magnesium.

With this configuration, a short circuit between the first internal electrodes 12 and the second internal electrodes 13 is difficult to occur in the production process of the multi-layer ceramic capacitor 10, when foreign substances with electrical conductivity adhere to the side surfaces of the multi-layer unit 16, which are oriented in the Y-axis direction, and also when the oxidized regions 12a and 13a come close to or come into contact with each other due to the deformation of the multi-layer unit 16. This further improves the reliability of the multi-layer ceramic capacitor 10.

Further, magnesium has the action of improving the sinterability of dielectric ceramics. Thus, in the side margins 17 where the sinterability is more difficult to ensure than in the ceramic layers 21, the concentration of magnesium of the side margins 17 is desirably set to be higher than that of the ceramic layers 21. This allows a failure such as peel-off of the side margins 17 from the multi-layer unit 16 to be inhibited.

The concentration of magnesium of the ceramic layers 21 and the concentration of magnesium of the side margins 17 can be compared with each other at, for example, the center portions thereof in the Y-axis direction. In other words, the concentration of magnesium at the center portion of each side margin 17 in the Y-axis direction can be set to be higher than the concentration of magnesium at the center portion of each ceramic layer 21 in the Y-axis direction.

Further, the outer side of each side margin 17 in the Y-axis direction is more heated at the time of sintering, and thus the sinterability is likely to be ensured. As a result, as shown in FIG. 4, in the side margins 17, the concentration of magnesium desirably decreases from the bonding units 18 toward the outer sides of the side margins 17 in the Y-axis direction. This allows the amount of use of magnesium to be suppressed.

3. Method of Producing Multi-Layer Ceramic Capacitor 10

Figure 6:
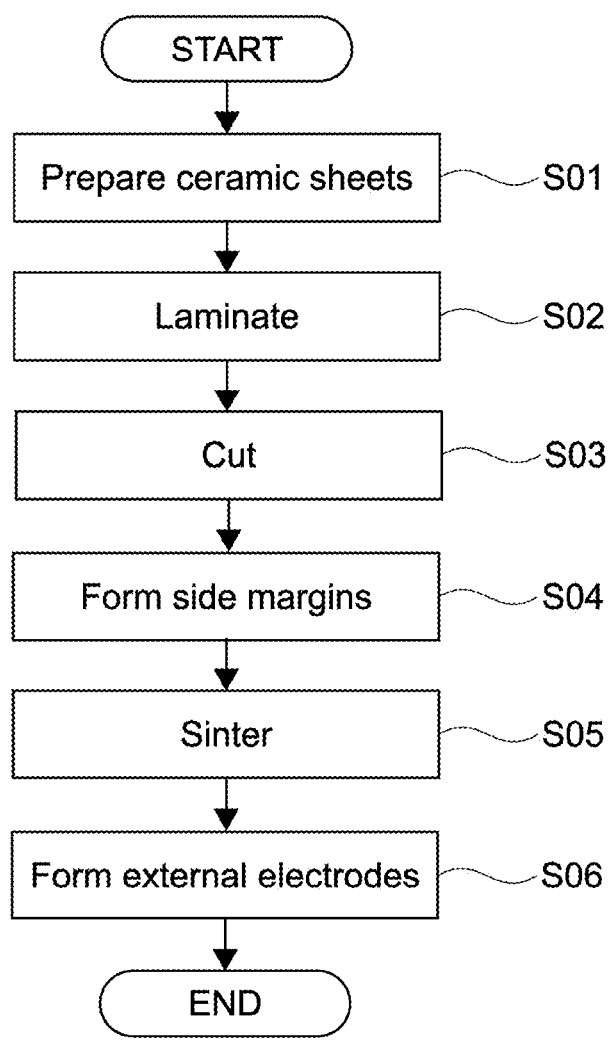
FIG. 6 is a flowchart showing a method of producing the multi-layer ceramic capacitor.
Figure 7:
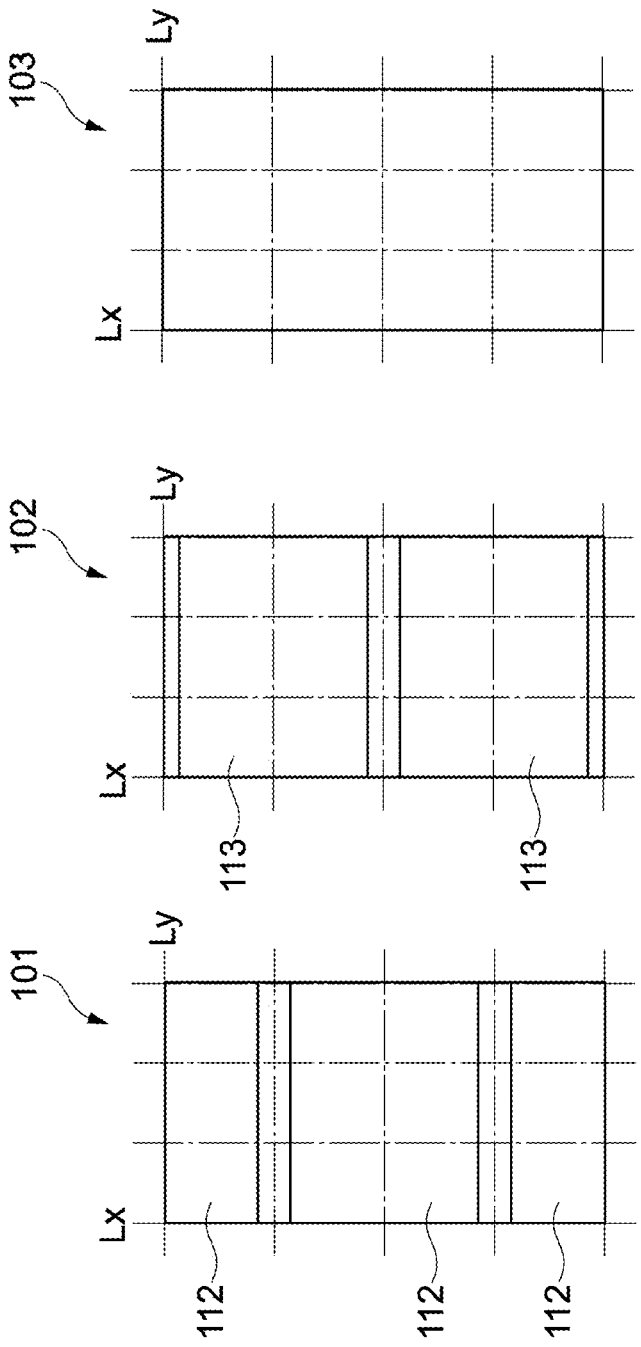
FIG. 7A is a plan view showing a production process of the multi-layer ceramic capacitor.
FIG. 7B is a plan view showing the production process of the multi-layer ceramic capacitor.
FIG. 7C is a plan view showing the production process of the multi-layer ceramic capacitor.

FIG. 6 is a flowchart showing a method of producing the multi-layer ceramic capacitor 10. FIGS. 7A to 12 are views each showing a production process of the multi-layer ceramic capacitor 10. Hereinafter, the method of producing the multi-layer ceramic capacitor 10 will be described along FIG. 6 with reference to FIGS. 7A to 12 as appropriate.

3.1 Step S01: Preparation of Ceramic Sheets

In Step S01, first ceramic sheets 101 and second ceramic sheets 102 for forming the capacitance forming unit 19, and third ceramic sheets 103 for forming the covers 20 are prepared. The first, second, and third ceramic sheets 101, 102, and 103 are formed as unsintered dielectric green sheets mainly containing dielectric ceramics.

The first, second, and third ceramic sheets 101, 102, and 103 are formed into sheets by using a roll coater or a doctor blade, for example. It is not absolutely necessary for the first and second ceramic sheets 101 and 102 to contain magnesium, but the first and second ceramic sheets 101 and 102 may contain magnesium in small amounts as needed.

FIGS. 7A, 7B, and 7C are plan views of the first, second, and third ceramic sheets 101, 102, and 103, respectively. At this stage, the first, second, and third ceramic sheets 101, 102, and 103 are each formed into a large-sized sheet that is not singulated. FIGS. 7A, 7B, and 7C each show cutting lines Lx and Ly used when the sheets are singulated into the multi-layer ceramic capacitors 10. The cutting lines Lx are parallel to the X axis, and the cutting lines Ly are parallel to the Y axis.

As shown in FIGS. 7A, 7B, and 7C, unsintered first internal electrodes 112 corresponding to the first internal electrodes 12 are formed on the first ceramic sheet 101, and unsintered second internal electrodes 113 corresponding to the second internal electrodes 13 are formed on the second ceramic sheet 102. It should be noted that no internal electrodes are formed on the third ceramic sheets 103 corresponding to the covers 20.

The first and second internal electrodes 112 and 113 can be formed by applying an arbitrary electrical conductive paste to the first and second ceramic sheets 101 and 102. A method of applying an electrical conductive paste can be arbitrarily selected from well-known techniques. For example, for the application of an electrical conductive paste, a screen printing method or a gravure printing method can be used.

In the first and second internal electrodes 112 and 113, gaps are disposed along the cutting lines Ly in the X-axis direction for every other cutting line Ly. The gaps of the first internal electrodes 112 and the gaps of the second internal electrodes 113 are alternately disposed in the X-axis direction. In other words, a cutting line Ly passing through a gap between the first internal electrodes 112 and a cutting line Ly passing through a gap between the second internal electrodes 113 are alternately disposed.

3.2 Step S02: Lamination

Figure 8:
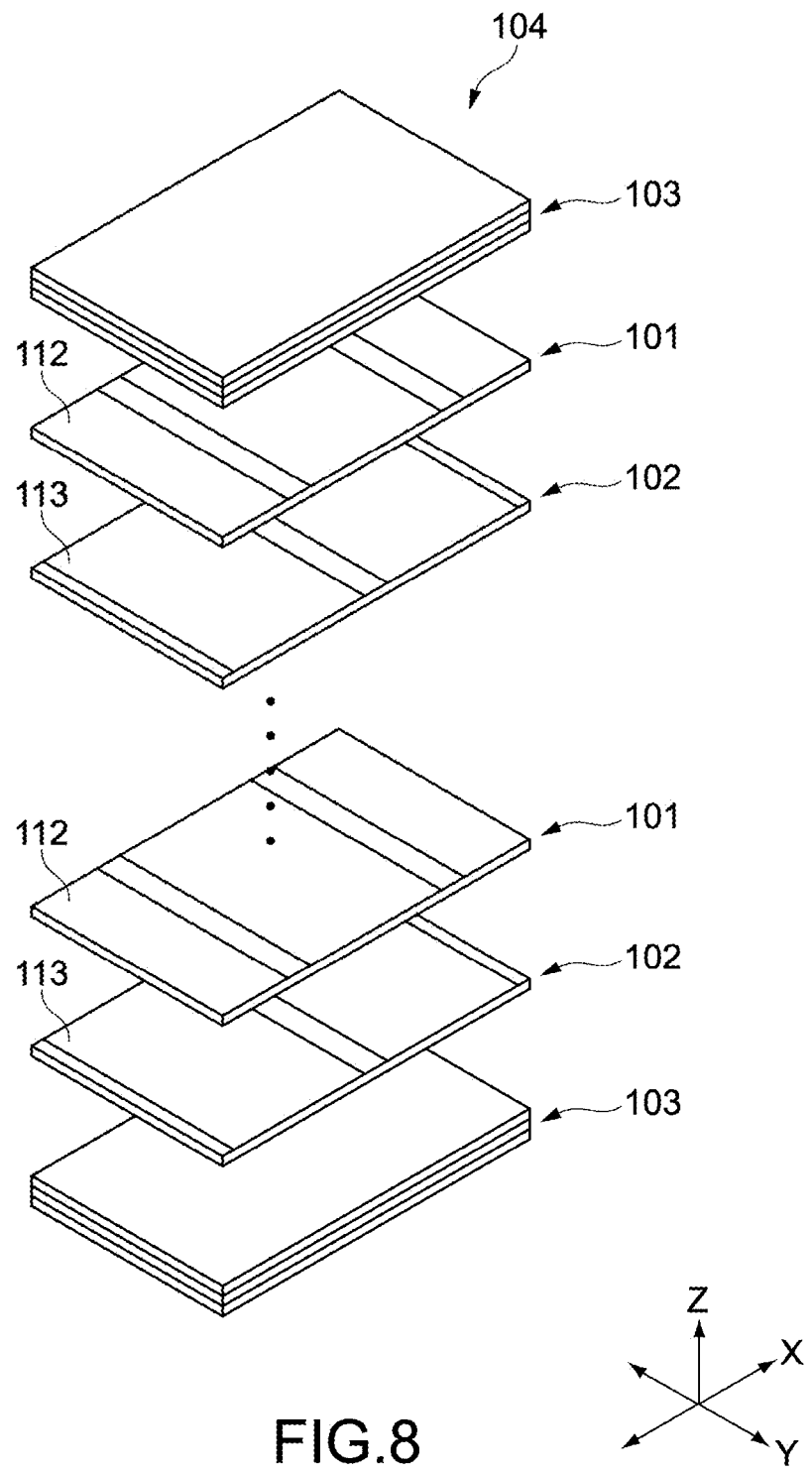
FIG. 8 is a perspective view showing the production process of the multi-layer ceramic capacitor.

In Step S02, the first, second, and third ceramic sheets 101, 102, and 103 prepared in Step S01 are laminated as shown in FIG. 8, to produce a multi-layer sheet 104. In the multi-layer sheet 104, the first ceramic sheets 101 and the second ceramic sheets 102 that correspond to the capacitance forming unit 19 are alternately laminated in the Z-axis direction.

Further, in the multi-layer sheet 104, the third ceramic sheets 103 corresponding to the covers 20 are laminated on the uppermost and lowermost surfaces of the first and second ceramic sheets 101 and 102 alternately laminated in the Z-axis direction. It should be noted that in the example shown in FIG. 8, three third ceramic sheets 103 are laminated on each of the uppermost and lowermost surfaces of the laminated first and second ceramic sheets 101 and 102, but the number of third ceramic sheets 103 can be changed as appropriate.

The multi-layer sheet 104 is integrated by pressure-bonding the first, second, and third ceramic sheets 101, 102, and 103. For the pressure-bonding of the first, second, and third ceramic sheets 101, 102, and 103, for example, hydrostatic pressing or uniaxial pressing is desirably used. With this configuration, a high-density multi-layer sheet 104 can be obtained.

3.3 Step S03: Cutting

Figure 9:
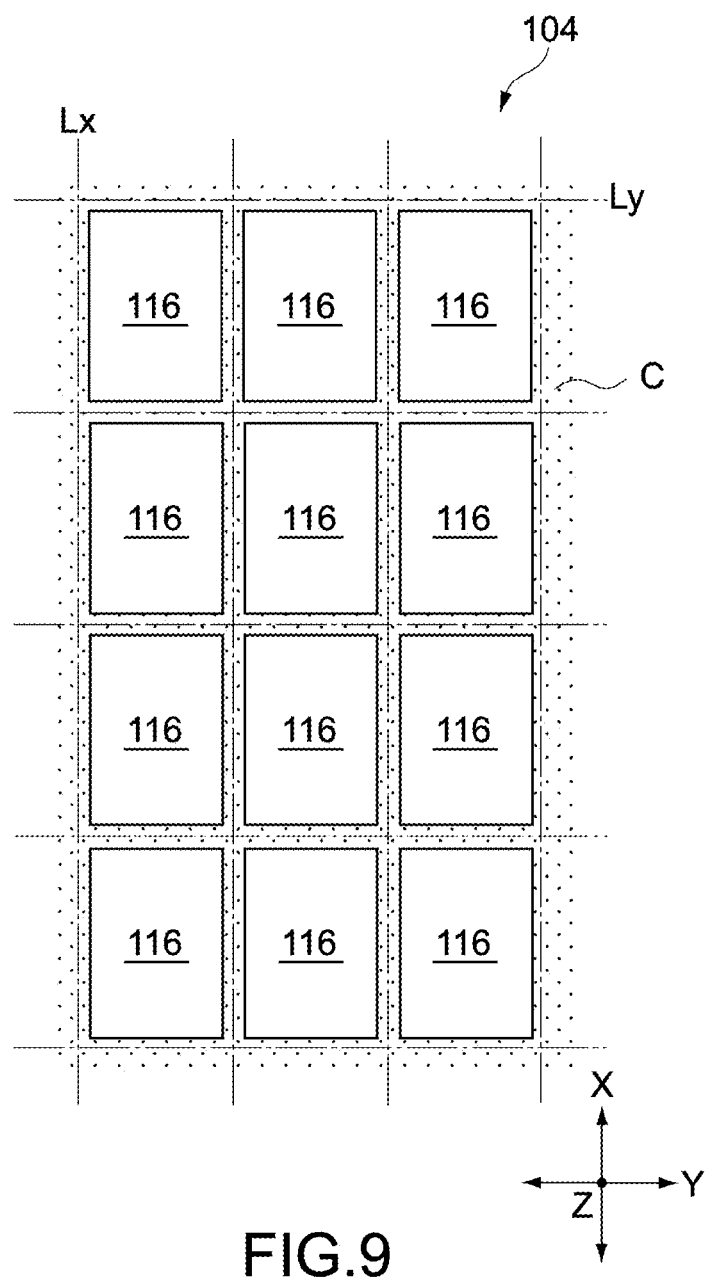
FIG. 9 is a plan view showing the production process of the multi-layer ceramic capacitor.

In Step S03, the multi-layer sheet 104 obtained in Step S02 is cut along the cutting lines Lx and Ly as shown in FIG. 9, to produce unsintered multi-layer chips 116. Each of the multi-layer chips 116 corresponds to a multi-layer unit 16 after sintering. The multi-layer sheet 104 is cut with a rotary blade, a push-cutting blade, or the like.

More specifically, the multi-layer sheet 104 is cut along the cutting lines Lx and Ly while being held by a holding member C. As a result, the multi-layer sheet 104 is singulated, so that the multi-layer chips 116 are obtained. At that time, the holding member C is not cut, and thus the multi-layer chips 116 are connected via the holding member C.

Figure 10:
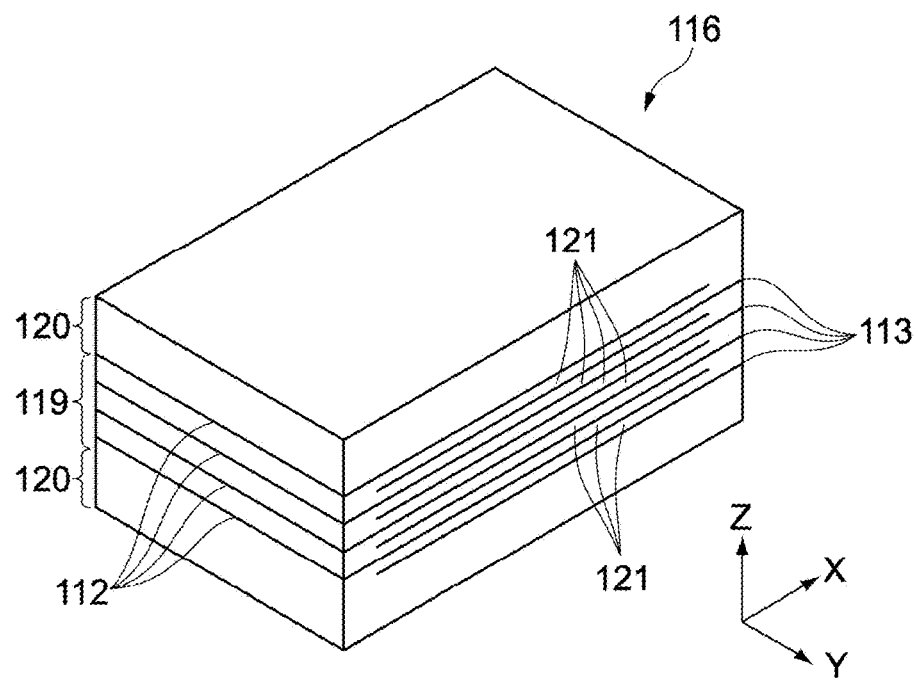
FIG. 10 is a perspective view showing the production process of the multi-layer ceramic capacitor.
Figure 11:
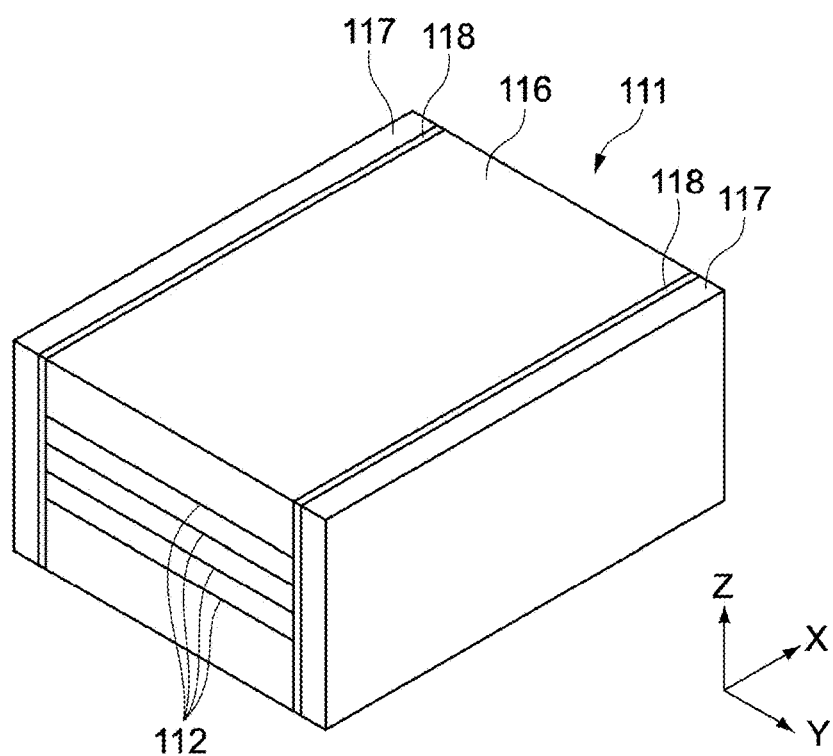
FIG. 11 is a perspective view showing the production process of the multi-layer ceramic capacitor.

FIG. 10 is a perspective view of the multi-layer chip 116 obtained in Step S03. The multi-layer chip 116 includes a capacitance forming unit 119 and covers 120. In the multi-layer chip 116, the first and second internal electrodes 112 and 113 are exposed to the cut surfaces, i.e., both the side surfaces oriented in the Y-axis direction. Ceramic layers 121 are formed between the first and second internal electrodes 112 and 113.

3.4 Step S04: Formation of Side Margins

In Step S04, unsintered side margins 117 are provided via unsintered bonding units 118 to the side surfaces of the multi-layer chip 116 obtained in Step S03, from which the first and second internal electrodes 112 and 113 are exposed, and an unsintered ceramic body 111 is thus produced. The side margins 117 are made of ceramic sheets.

In Step S04, the side margins 117 are provided to both the side surfaces oriented in the Y-axis direction, both the side surfaces being the cut surfaces of the multi-layer chip 116 in Step S03. For that reason, in Step S04, it is desirable to previously detach the multi-layer chips 116 from the holding member C and rotate the multi-layer chips 116 by 90 degrees.

The bonding units 118 have a higher concentration of magnesium than the first and second ceramic sheets 101 and 102, which form the ceramic layers 121, and the ceramic sheets forming the side margins 117. With this configuration, the bonding units 118 function as a supply source of magnesium to the multi-layer chip 116 and the side margins 117 at the time of sintering.

If the ceramic sheets forming the side margins 117 fail to obtain satisfactory sinterability by only the magnesium supplied from the bonding units 118 at the time of sintering, those ceramic sheets may contain a predetermined amount of magnesium in advance. The concentration of magnesium of the side margins 117 can be determined as appropriate within the range of concentration lower than that of the bonding units 118.

Further, the bonding units 118 have functions of favorably coupling the multi-layer chip 116 and the side margins 117 and inhibiting the occurrence of a crack, peel-off, or the like in the multi-layer chip 116 and the side margins 117 at the time of sintering. A specific example of the configuration of the bonding units 118 for achieving those functions will be described in the following section (Step S05).

3.5 Step S05: Sintering

In Step S05, the unsintered ceramic body 111 obtained in Step S04 is sintered to produce the ceramic body 11 of the multi-layer ceramic capacitor 10 shown in FIGS. 1 to 3. In other words, in Step S05, the multi-layer chip 116 becomes the multi-layer unit 16, the side margins 117 become the side margins 17, and the bonding units 118 become the bonding units 18.

A sintering temperature in Step S05 can be determined on the basis of a sintering temperature for the ceramic body 111. For example, when a barium titanate based material is used as dielectric ceramics, the sintering temperature can be set to approximately 1,000 to 1,300° C. Further, sintering can be performed in a reduction atmosphere or a low-oxygen partial pressure atmosphere, for example.

Figure 12:
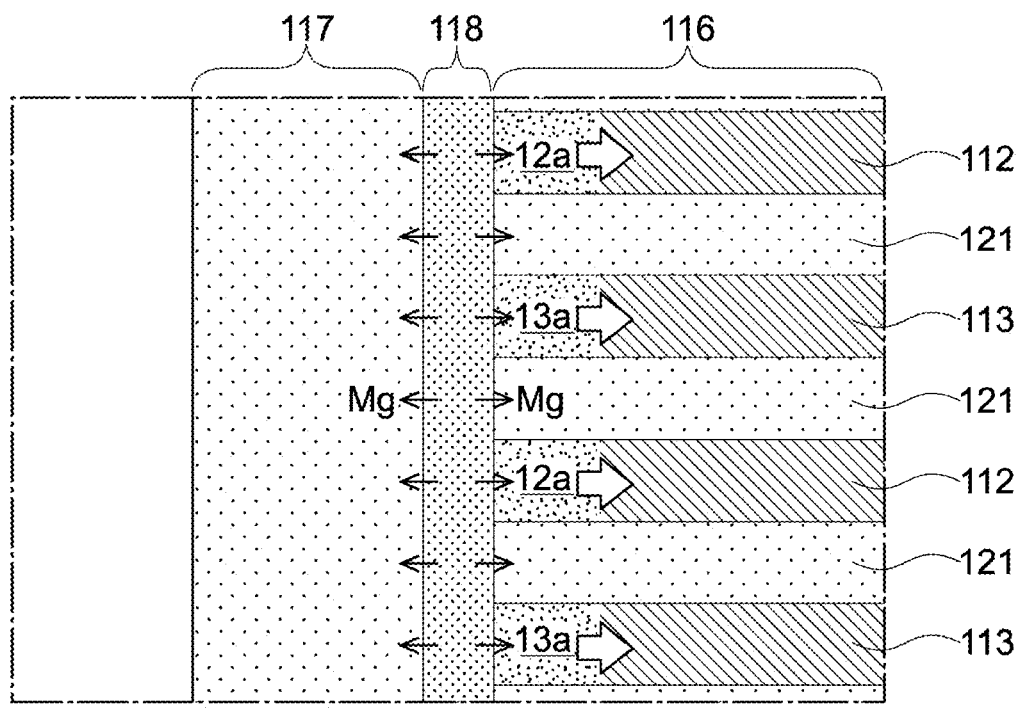
FIG. 12 is a partial cross-sectional view showing diffusion behavior of magnesium in the production process of the multi-layer ceramic capacitor.

FIG. 12 is a partial cross-sectional view showing diffusion behavior of magnesium at the time of sintering. As shown in FIG. 12, the magnesium contained in the bonding unit 118 diffuses to both the multi-layer chip 116 and the side margin 117. As a result, the sintered ceramic body 11 obtains a characteristic distribution of the concentration of magnesium as shown in FIG. 4.

Further, as shown in FIG. 12, at the time of sintering, the magnesium contained in the bonding unit 118 is supplied to the end portions of the first and second internal electrodes 112 and 113 in the Y-axis direction, and the oxidized regions 12$a$ and 13$a$ are formed while nickel forming the first and second internal electrodes 112 and 113 is taking in magnesium and oxygen. The oxidized regions 12$a$ and 13$a$ grow toward the center portions of the first and second internal electrodes 112 and 113 in the Y-axis direction, respectively, during sintering.

When the concentration of magnesium of the bonding unit 118 is increased in such a manner, magnesium can be accurately supplied to regions of the first and second internal electrodes 112 and 113, in which the oxidized regions 12$a$ and 13$a$ are respectively formed. As a result, the oxidized regions 12$a$ and 13$a$ can be formed efficiently and reliably in the first and second internal electrodes 112 and 113, respectively.

Further, since the concentration of magnesium of the bonding unit 118 is higher than that of the side margin 117 and the ceramic layers 121, the movement of magnesium from the side margin 117 to the ceramic layers 121 is difficult to occur. In other words, the bonding unit 118 functions as a barrier layer that inhibits the movement of magnesium from the side margin 117 to the ceramic layers 121.

This can inhibit the magnesium contained in the side margin 117 from diffusing to the ceramic layers 121 even when the side margin 117 contains magnesium in larger amounts than the ceramic layers 121. As a result, the concentration of magnesium is retained in the side margin 117, and the sinterability can thus be ensured.

Further, since the large amount of magnesium can be inhibited from diffusing from the side margin 117 to the ceramic layers 121, lowering of the dielectric constant c in the ceramic layers 21 can be suppressed. Thus, the multi-layer ceramic capacitor 10 obtained by this production method can ensure the capacitance.

As described above, the bonding units 118 have functions of favorably coupling the multi-layer chip 116 and the side margins 117 and inhibiting the side margins 117 from being peeled off from the multi-layer chip 116 at the time of sintering. The configuration of the bonding units 118 for achieving those functions is not limited to a specific one. Hereinafter, a specific example of the configuration of the bonding units 118 will be described.

The bonding units 118 can be formed using dielectric ceramics whose average grain diameter is smaller than that of the multi-layer chip 116 and the side margins 117. With this configuration, the bonding units 118 dig into minute irregularities of the multi-layer chip 116 and the side margins 117, and the adhesion of the bonding units 118 to the multi-layer chip 116 and the side margins 117 is improved.

Further, since the bonding units 118 formed of dielectric ceramics having a small average grain diameter are flexibly deformable at the time of sintering, a difference in shrinkage behavior between the multi-layer chip 116 and each of the side margins 117 can be relieved. This allows a crack, peel-off, or the like in the multi-layer chip 116 and the side margins 117 to be inhibited from occurring.

The average grain diameter of the dielectric ceramics forming the multi-layer chip 116, the side margins 117, and the bonding units 118 can be determined as appropriate. As an example, the average grain diameter of the dielectric ceramics forming the multi-layer chip 116 and the side margins 117 can be set to several hundreds of nm, and the average grain diameter of the dielectric ceramics forming the bonding units 118 can be set to several tens of nm.

Further, providing silicon into the bonding units 118 can also relieve a difference in shrinkage behavior between the multi-layer chip 116 and each of the side margins 117 at the time of sintering. In other words, in the bonding units 118 thus configured, a molten phase is generated while silicon is taking in surrounding components at the time of sintering. Thus, the bonding units 118 are flexibly deformable.

3.6 Step S06: Formation of External Electrodes

In Step S06, the first external electrode 14 and the second external electrode 15 are formed on the ceramic body 11 obtained in Step S05, to produce the multi-layer ceramic capacitor 10 shown in FIGS. 1 to 3. In Step S06, for example, base films, intermediate films, and surface films forming the first and second external electrodes 14 and 15 are formed on the end surfaces of the ceramic body 11 in the X-axis direction.

More specifically, in Step S06, first, an unsintered electrode material is applied so as to cover both the end surfaces of the ceramic body 11 in the X-axis direction. The applied unsintered electrode materials are subjected to baking in a reduction atmosphere or a low-oxygen partial pressure atmosphere, for example, to form base films of the first and second external electrodes 14 and 15 on the ceramic body 11.

On the base films of the first and second external electrodes 14 and 15, which are baked onto the ceramic body 11, intermediate films of the first and second external electrodes 14 and 15 are then formed, and surface films of the first and second external electrodes 14 and 15 are further formed. For the formation of the intermediate films and the surface films of the first and second external electrodes 14 and 15, for example, plating such as electrolytic plating can be used.

It should be noted that part of the processing in Step S06 described above may be performed before Step S05. For example, before Step S05, the unsintered electrode material may be applied to both the end surfaces of the unsintered ceramic body 111 that are oriented in the X-axis direction. As a result, in Step S05, sintering of the unsintered ceramic body 111 and baking of the unsintered electrode material can be simultaneously performed.

4. Examples 4.1 Production of Samples

For the Example of this embodiment, samples of the multi-layer ceramic capacitor 10 were produced by the production method described above. In those samples, the dimension in the X-axis direction was set to 1 mm, and the dimensions in the Y- and Z-axis directions were set to 0.5 mm. Further, in those samples, a barium titanate based material was used as dielectric ceramics.

The concentration of magnesium was analyzed for a cross section of a ceramic body 11 of each of the samples according to this Example, the cross section being parallel to the Y-Z plane. For the analysis of the concentration of magnesium, laser ablation inductively coupled plasma mass spectrometry (LA-ICP-MS) was used.

In the LA-ICP-MS, dielectric ceramics in a minute region of the cross section of the ceramic body 11 is evaporated/microparticulated and further ionized, and ions thus generated are measured with a mass spectrometer. Thus, the composition of the minute region of the cross section of the ceramic body 11 can be analyzed.

In this Example, $^{24}$Mg having a natural isotope ratio of 78.70% was used in the analysis of the concentration of magnesium. Further, $^{47}$Ti, which is an isotope of titanium contained in dielectric ceramics in large amounts, was used as a reference of the concentration of magnesium.

In this Example, the concentration of magnesium was analyzed for the side margins 17, the bonding units 18, and the multi-layer unit 16 at intervals of 15 μm in the Y-axis direction. The concentration of magnesium in the multi-layer unit 16 was analyzed in a minute region around the center portions of the ceramic layers 21 in the Z-axis direction.

Figure 13:
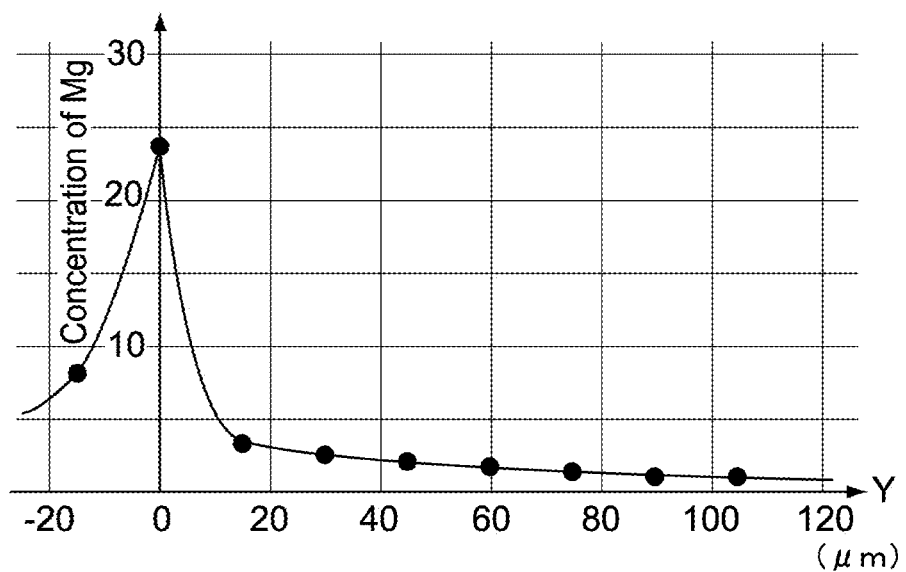
FIG. 13 is a graph showing evaluation results of the distribution of the concentration of magnesium in a ceramic body of a multi-layer ceramic capacitor according to Example of the embodiment.

FIG. 13 is a graph showing the distribution of the concentration of magnesium along the Y-axis direction in the cross section of the ceramic body 11 of each of the samples according to this Example, the cross section being parallel to the Y-Z plane. The horizontal axis of FIG. 13 represents the positions in the Y-axis direction in the ceramic body 11.

More specifically, on the horizontal axis of FIG. 13, assuming that the center portion of the bonding unit 18 in the Y-axis direction is "0", the position of the side margin 17 is represented as a negative region, and the position of the multi-layer unit 16 is represented as a positive region. In other words, the horizontal axis of FIG. 13 represents a distance from the center portion of the bonding unit 18 in the Y-axis direction.

The vertical axis of FIG. 13 represents the concentration of magnesium at each position of the side margin 17, the bonding unit 18, and the multi-layer unit 16. In FIG. 13, the concentration of magnesium at the position of 105 μm of the multi-layer unit 16 in the Y-axis direction is assumed as 1, and the concentration of magnesium at each position is standardized. Therefore, the vertical axis of FIG. 13 has an arbitrary unit.

As shown in FIG. 13, the multi-layer unit 16 and the side margin 17 in each sample according to this Example have the concentration of magnesium that increases toward the bonding unit 18. Therefore, in this Example, it was confirmed that use of the production method described above can achieve the distribution of the concentration of magnesium as shown in FIG. 4 in the ceramic body 11 of the multi-layer ceramic capacitor 10.

4.2 Evaluation of Samples

A short circuit percentage was evaluated for samples 1 to 4 produced under the condition where the concentration of magnesium differs from the bonding units 118 that are not yet sintered.

The concentration of magnesium contained in the bonding units 118 was set to 0 atm % in the sample 1, 0.95 atm % in the sample 2, 4.75 atm % in the sample 3, and 9.5 atm % in the sample 4. In other words, the sample 1 containing no magnesium in the bonding units 118 is Comparative Example of this embodiment, and the samples 2 to 4 are Examples of this embodiment. It should be noted that the concentration (atm %) refers to a concentration in the case where the B site of ceramics, which is a main component having the Perovskite structure represented by a general chemical formula, $ABO_3$, is set to 100 atm % in the dielectric ceramics used for the bonding units 118.

The short circuit percentage was evaluated with an LCR meter under the conditions where an oscillation level (Osc) is 0.5 V and a voltage with the frequency of 1 kHz is applied. 200 pieces of each of the samples 1 to 4 were evaluated. For each of the samples 1 to 4, the proportion of the pieces in which a short circuit has occurred out of the 200 pieces was assumed as a short circuit percentage.

Consequently, the sample 1 according to Comparative Example had a short circuit percentage of 50%. It is probable that, since the sample 1 does not contain magnesium in the bonding units 18, satisfactory oxidized regions 12a and 13a are not formed in the first internal electrodes 12 and the second internal electrodes 13, respectively, and a short circuit easily occurs between the first internal electrodes 12 and the second internal electrodes 13.

Meanwhile, the sample 2 had a short circuit percentage of 10%, the sample 3 had a short circuit percentage of 7%, and the sample 4 had a short circuit percentage of 3%. In other words, it was confirmed that any of the samples 2 to 4 according to Example has a short circuit percentage within the range of 10% and obtains high reliability.

Further, when the capacitance was evaluated for the samples 2 to 4, each of the samples 2 to 4 satisfactorily obtained the capacitance. However, it was confirmed that in order to obtain a large capacitance in the multi-layer ceramic capacitor 10, the concentration of magnesium in the bonding units 118 is desirably kept to 9.5 atm % or less.

5. Other Embodiments

While the embodiment of the present invention has been described, the present invention is not limited to the embodiment described above, and it should be appreciated that the present invention may be variously modified.

For example, in the multi-layer ceramic capacitor 10, the capacitance forming unit 19 may be divided into capacitance forming units in the Z-axis direction. In this case, in each capacitance forming unit 19, the first internal electrodes 12 and the second internal electrodes 13 only need to be alternately disposed along the Z-axis direction. In a portion where the capacitance forming units 19 are next to each other, the first internal electrodes 12 or the second internal electrodes 13 may be continuously disposed.

What is claimed is:
1. A multi-layer ceramic capacitor, comprising:
a multi-layer unit that includes
   ceramic layers laminated in a first direction, and
   internal electrodes disposed between the ceramic layers and mainly containing nickel;
a side margin that covers the multi-layer unit from a second direction orthogonal to the first direction; and
a bonding unit that is disposed between the multi-layer unit and the side margin and has a higher concentration of magnesium than the ceramic layers and the side margin,
wherein a center portion of the side margin in the second direction has a higher concentration of magnesium than center portions of the ceramic layers in the second direction.

2. A multi-layer ceramic capacitor, comprising:
a multi-layer unit that includes
   ceramic layers laminated in a first direction, and
   internal electrodes disposed between the ceramic layers and mainly containing nickel;
a side margin that covers the multi-layer unit from a second direction orthogonal to the first direction; and
a bonding unit that is disposed between the multi-layer unit and the side margin and has a higher concentration of magnesium than the ceramic layers and the side margin,
wherein each of the internal electrodes includes an oxidized region, the oxidized region being adjacent to the bonding unit and containing nickel and magnesium, and
wherein a center portion of the side margin in the second direction has a higher concentration of magnesium than center portions of the ceramic layers in the second direction.

3. A multi-layer ceramic capacitor, comprising:
a multi-layer unit that includes
   ceramic layers laminated in a first direction, and
   internal electrodes disposed between the ceramic layers and mainly containing nickel;
a side margin that covers the multi-layer unit from a second direction orthogonal to the first direction; and
a bonding unit that is disposed between the multi-layer unit and the side margin and has a higher concentration of magnesium than the ceramic layers and the side margin,
wherein a region adjacent to the bonding unit in the ceramic layers has a higher concentration of magnesium than center portions of the ceramic layers in the second direction.

4. The multi-layer ceramic capacitor according to claim 3, wherein the concentration of magnesium in the ceramic layers and the side margin increases toward the bonding unit.

* * * * *